United States Patent [19]

Pipper et al.

[11] Patent Number: 4,539,391
[45] Date of Patent: Sep. 3, 1985

[54] CONTINUOUS HYDROLYTIC PREPARATION OF POLYLACTAMS

[75] Inventors: Gunter Pipper, Bad Durkheim; Rainer Theysohn, Frankenthal; Franz Zahradnik, Ludwigshafen, all of Fed. Rep. of Germany

[73] Assignee: BASF Aktiengesellschaft, Fed. Rep. of Germany

[21] Appl. No.: 581,711

[22] Filed: Feb. 21, 1984

[30] Foreign Application Priority Data

Feb. 26, 1983 [DE] Fed. Rep. of Germany ....... 3306906

[51] Int. Cl.$^3$ ............................................. C08G 69/16
[52] U.S. Cl. ..................................... 528/323; 526/67; 526/71
[58] Field of Search ..................... 528/323; 526/67, 71

[56] References Cited

U.S. PATENT DOCUMENTS 4,049,638 9/1977 Doerfel et al. .................. 260/78 L

*Primary Examiner*—Harold D. Anderson
*Attorney, Agent, or Firm*—Keil & Weinkauf

[57] ABSTRACT

Polylactams are prepared continuously by a process in which a lactam containing from 1 to 25% by weight of water is heated in a prepolymerization zone under a pressure of from 1 to 10 bar at from 220° to 280° C. for 1 to 10 minutes, water being vaporized at the same time, with the proviso that the degree of conversion on emergence from the prepolymerization zone is not less than 85%, the prepolymer and the vapor are separated continuously, and the prepolymer is passed into a polymerization zone and is polymerized further under superatmospheric pressure at from 240° to 290° C.

7 Claims, No Drawings

CONTINUOUS HYDROLYTIC PREPARATION OF POLYLACTAMS

A relatively large number of processes for the preparation of nylons, eg. polycaprolactam, are known. The majority of these processes are carried out under atmospheric pressure, using the precondensation method. Under atmospheric pressure and at nylon-forming temperatures of from 250° to 270° C., the polymerization times required are in general from 20 to 40 hours. Such processes have the disadvantages that the starting materials and the polymers are subjected to thermal stress for a long time, which leads to discoloration and increased gel formation. East German Pat. No. 54,809 describes a three-stage apparatus for the polymerization of caprolactam. In this apparatus, prepolymerization is carried out in a descending tube, steam is then removed in a drier, and polymerization of the prepolymer is completed in a downstream vertical tube with spiral stirrers passing along the wall. Furthermore, German Laid-Open Application DOS No. 2,443,566 discloses a process in which, in a first stage, water-containing caprolactam is prepolymerized, while preventing the formation of a vapor phase, until a minimum conversion of 80% is reached, the mixture is let down to a lower pressure and directly thereafter, in a third reaction zone, is heated with the formation of steam, and this is separated off in a fourth reaction zone. These procedures are still very time-consuming, the reaction mixture having to be kept at nylon-forming temperatures for a relatively long time. The process for the preparation of polylactams is therefore in need of improvement.

It is an object of the present invention to provide a continuous process for the preparation of polylactams which is complete in a short time and in which the reaction mixture is present at a melt only for a very short time and the resulting gel content is very low. Furthermore, the content of oligomers which are difficult to extract should be kept very low.

We have found that this object is achieved by a process for the continuous preparation of polylactams, in which, in a prepolymerization zone, a lactam containing from 1 to 25% by weight of water is heated at from 220° to 280° C. under superatmospheric pressure to form a prepolymer, the prepolymer and vapor are separated continuously, and the former is passed into a polymerization zone and is polymerized further under superatmospheric pressure and at from 240° to 290° C., wherein the water-containing lactam is heated in the prepolymerization zone for from 1 to 10 minutes under a pressure of from 1 to 10 bar with simultaneous vaporization of the water, with the proviso that, on emergence from the prepolymerization zone, the degree of conversion is not less than 85%.

The novel process has the advantages that it takes place in a relatively short time, the polymer has to be kept in the molten state for only a relatively short time, and the risk of gel formation and the content of oligomers which are difficult to extract are reduced.

In accordance with the invention, a lactam containing from 1 to 25% by weight of water is used, suitable lactams being those having from 7 to 12 ring members, eg. caprolactam or caprylolactam, or mixtures of these. Caprolactam is particularly important industrially. Advantageously, the water content is from 1 to 20% by weight. The starting solution can contain conventional additives, such as dulling agents, eg. titanium dioxide, or stabilizers. Moreover, other nylon-forming compounds, such as salts of dicarboxylic acids with diamines, can also be used.

The water-containing lactam is advantageously passed continuously into a prepolymerization zone, at from 50° to 100° C. In this zone, the lactam is heated at from 220° to 280° C. under a pressure of from 1 to 10 bar, vaporization of water and formation of a prepolymer taking place at the same time. Advantageously, a pressure of from 2 to 6 bar is employed, and heating is carried out at from 240° to 280° C.

A residence time of from 1 to 10 minutes is maintained in the prepolymerization zone, which is advantageously in the form of a tube bundle. Tube bundles which have proven particularly useful are those whose tubes change in cross-section at repeating intervals, the cross-section being tubular or slot-like. In this preferred procedure, residence times of from 60 to 180 seconds have proven particularly useful. In another advantageous procedure, the mixture of prepolymer and vapor is passed, before separation of the phases, through a tubular mass transfer zone which is directly downstream from the prepolymerization zone and is provided with baffles. In this zone, the temperatures and pressures used in the prepolymerization zone are maintained. The baffles, for example packings, such as Raschig rings, metal rings or, in particular, wire net, have proven particularly useful. As a rule, a residence time of from 1 to 10 minutes is maintained in the mass transfer zone.

The two-phase vapor/prepolymer mixture emerging from the prepolymerization zone or mass transfer zone is separated. As a rule, separation takes place automatically as a result of the physical differences in a vessel, the lower part of the vessel advantageously being designed as a polymerization zone. The vapors liberated essentially consist of steam and small amounts of lactams which have been liberated during vaporization of the water. Advantageously, these vapors are passed into a column and rectified. Examples of suitable columns are packed columns, bubble tray columns or sieve tray columns with from 5 to 15 theoretical plates. The column is advantageously operated under the same pressure conditions as the prepolymerization zone. The lactam present in the vapors is separated off, and is advantageously recycled to the prepolymerization zone.

The resulting prepolymer, which essentially consists of low molecular weight polylactams and as a rule has a relative viscosity of from 1.2 to 1.5, is passed into a polymerization zone. In this zone, the melt obtained is polymerized further at from 240° to 290° C. and under from 1 to 10, in particular from 2 to 6, bar. Advantageously, a residence time of from 5 to 20 minutes is maintained in the polymerization zone. The polycaprolactam thus obtained has a relative viscosity of, as a rule, from 1.6 to 2.2, and is continuously removed from the polymerization zone.

In a preferred procedure, the resulting nylon is passed, in the form of a melt, through a discharge zone, the residual water present in the melt being removed at the same time. Examples of suitable discharge zones are vented extruders. The melt which has been freed from water in this manner is then extruded, and the extrudates are granulated. The granules obtained, advantageously in the solid phase, are polymerized to the desired viscosity by means of superheated steam and/or nitrogen at below the melting point, eg. from 140° to 180° C., this being done expediently after removal of the monomers and oligomers by extraction with water at elevated temperatures. Advantageously, the steam obtained at the top of the column is used for this purpose.

In another preferred procedure, the nylon obtained from the polymerization zone is passed, in the form of a melt, through a devolatilizing zone in which water, monomers and oligomers are removed under reduced pressure, for example in a vented extruder, and then through a further polymerization zone in which the nylon, in the molten state, is polymerized to the desired viscosity. The polycaprolactam prepared by the process is useful for the production of moldings, films, filaments and fibers.

The Example which follows illustrates the process according to the invention.

EXAMPLE 1

An aqueous caprolactam solution containing 80% by weight of caprolactam is transferred from a heated stock vessel at 80° C. into a vertical tubular vaporizer by means of a metering pump, at a rate corresponding to 4.5 kg/hour of nylon. The vaporizer is heated by a liquid heat-transfer medium at 285° C., which is circulated vigorously. The vaporizer is 3 m long and has a capacity of 180 ml and a heat-transfer surface of 1,300 $cm^2$. The residence time in the vaporizer is from 80 to 90 seconds. The prepolymer water mixture emerging from the prepolymerization zone is at 280° C., and is separated, in a separator, into steam and a melt. The melt remains in the separator for a further 20 minutes, and is then extruded by means of an extruder provided with a devolatilizing zone, is solidified in a water bath and is then granulated. The separator and the prepolymerization zone are kept under a pressure of 10 bar by means of a pressure regulator downstream from the column. The steam separated off in the separator is passed into a packed column having about 10 theoretical plates, and about 1 liter/hour of condensed vapors is introduced at the top to produce a reflux. The top of the column is at 178° C. The steam emerging from the pressure-release valve contains less than 0.02% by weight of caprolactam. A solution of 4.7% by weight, based on polycaprolactam produced, of caprolactam is obtained at the bottom of the column. This solution is recycled to the starting solution upstream from the prepolymerization zone, using a metering pump.

The polymer discharged from the polymerization zone has a relative viscosity of from 1.69 to 1.72, measured in 98% strength by weight sulfuric acid at 20° C., and contains from 10.2 to 11.1% by weight of methanol-soluble components. The sum of the terminal groups is 230–240 equivalents per ton for equivalent terminal groups. In the extruder, the melt is let down to atmospheric pressure, and undergoes virtually no further polymerization during a residence time of less than 1 minute. The resulting granules are extracted with hot water and then polymerized in the solid phase to a final viscosity of 2.6, using nitrogen at 180° C. during a residence time of 35 hours.

We claim:

1. A process for the continuous preparation of a molten or solid polylactam, which comprises
   (a) feeding a lactam melt containing from 1 to 25% by weight of water into a prepolymerization zone,
   (b) heating this lactam melt in the prepolymerization zone at from 220° to 280° C. under a pressure of from 1 to 10 bar for from 1 to 10 minutes, formation of a prepolymer melt and vaporization of the water taking place at the same time, and removing the melt from the prepolymerization zone, with the proviso that, when the melt emerges from the prepolymerization zone, the degree of conversion is not less than 85%,
   (c) continuously separating off steam from the resulting melt of the prepolymer,
   (d) transferring the prepolymer melt to a polymerization zone and
   (e) polymerizing the prepolymer melt in the polymerization zone under superatmospheric pressure and at from 240° to 290° C.

2. A process as claimed in claim 1, wherein the degree of conversion on emergence from the prepolymerization zone is not less than 88%.

3. A process as claimed in claim 1, wherein the prepolymerization zone is alternately tubular and slot-shaped, and the residence time in the prepolymerization zone is from 60 to 180 seconds.

4. A process as claimed in claim 1, wherein the polylactam, in the form of a melt, is passed from the polymerization zone through a discharge zone with removal of water, and is granulated, extracted with water, and polymerized in the solid phase to the desired viscosity.

5. A process as claimed in claim 1, wherein the polylactam, in the form of a melt, is passed from the polymerization zone through a discharge zone in which residual water, monomers and oligomers are removed under reduced pressure, and is granulated, and polymerized in the solid phase to the desired viscosity.

6. A process as set forth in claim 4, wherein the steam obtained in separator (C), after lactams have been separated off, is passed to a zone where polylactam is polymerized in the solid phase.

7. A process as claimed in claim 5, wherein the final polymerization to the desired viscosity is conducted in the molten state.

* * * * *